April 13, 1954  B. J. WASALASKI  2,675,182
EAR CORN REDUCING ROLL
Filed May 29, 1950
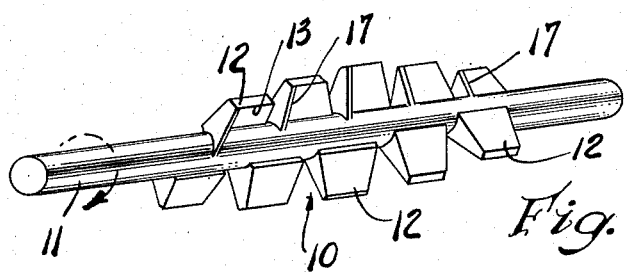
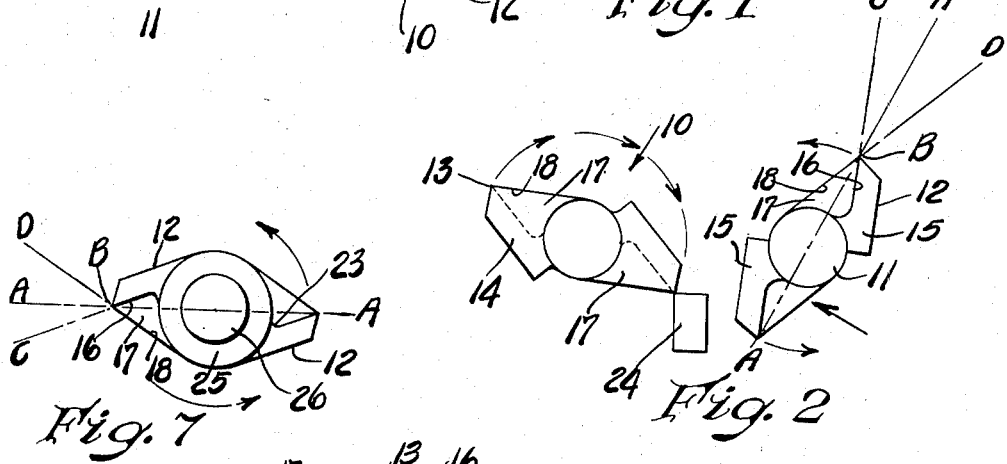
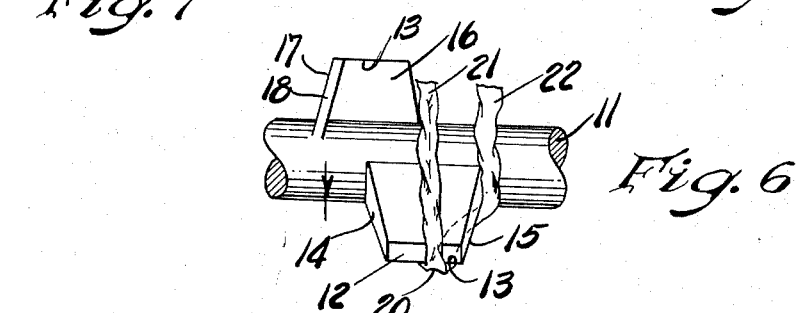
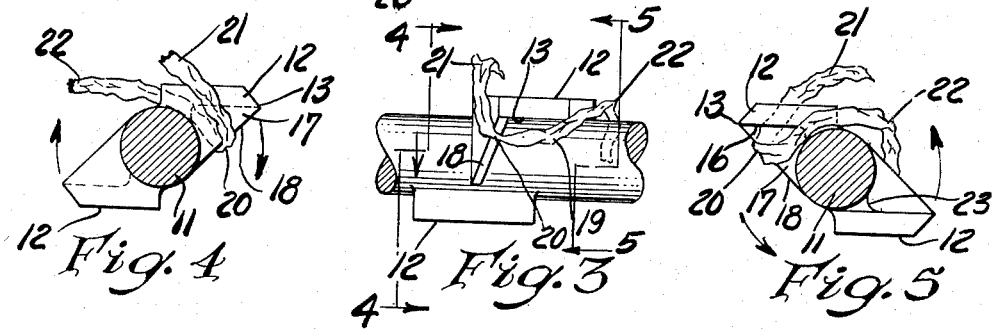
INVENTOR.
Barney J. Wasalaski
BY
Frank C. Learman
ATTORNEY Patented Apr. 13, 1954

2,675,182

UNITED STATES PATENT OFFICE 2,675,182

EAR CORN REDUCING ROLL

Barney J. Wasalaski, Saginaw, Mich., assignor to Nickle Engineering, Saginaw, Mich.

Application May 29, 1950, Serial No. 164,993

9 Claims. (Cl. 241—293)

This invention relates to improvements in toothed rolls for use in crushing and cutting machines which reduce ear corn to a size that may be mechanically fed to feed-grinding mills, or for any purpose which does not require a finely divided product such as obtained by pulverization. More especially, it has reference to toothed rolls that are adapted for reducing machine-harvested ear corn that is not completely husked, or snapped ear corn carrying all the husks, the reduction being made without the husks becoming entangled on the teeth and winding around the roll.

In order to avoid entanglement of husks on toothed earcorn crushing rolls of the prior art, it has been usual practice to either tilt the teeth backward relative to a radial line or else use teeth with insufficient projection to afford efficient biting action on large ears of corn. When the teeth have a negative rake angle relative to the direction of movement, such roll teeth tend to strike or bat the ears of corn upwardly and out of reach of the teeth instead of engaging and forcing same down into the crushing zone. Also, as a result of the negative rake, husks tend to accumulate above the roll teeth, thereby curtailing output of the reduced material. Further, teeth formed with a positive rake angle on the working face tend to become entangled with ribbons of husks looping around the individual teeth, the trailing ends winding around the rotative element and fouling the operation. Moreover, the heat generated by friction of such entangled husks, rubbing against a stationary element, constitutes a serious fire hazard.

The prime object of this invention is to provide an ear corn reducing roll having teeth which cannot become permanently entangled with husks despite the fact that the teeth are formed with positive rake angle on the working face.

Also, an object is to provide an unbreakable tooth which can withstand severe shock when stones or tramp metal are fed into the machine and caught between a pair of coacting rolls or one roll and stationary shearing element.

In the drawing:

Fig. 1 is an isometric view of an ear corn reducing roll in which is embodied the present invention.

Fig. 2 is an enlarged elevational end view of a pair of coacting rolls, such as shown in Fig. 1, the arrows indicating the direction of rotation.

Fig. 3 is a fragmentary longitudinal view of the roll shown in Fig. 1 with a ribbon of husk entangled thereon.

Fig. 4 is a transverse, sectional view taken on the line 4—4 of Fig. 3.

Fig. 5 is a view similar to Fig. 4 and taken on the line 5—5 of Fig. 3.

Fig. 6 is a plan view of the roll shown in Fig. 3.

Fig. 7 is an end view of a modified construction showing a tooth-carrying element that is removable from the shaft.

Referring to Fig. 1 of the drawing in which is shown an embodiment of my invention, the numeral 10 indicates a roll assembly which consists of shaft 11 upon which is mounted a plurality of teeth 12 that are axially and circumferentially spaced to form one or more series of teeth with distal cutting edges 13 arranged in spiral formation, the direction of rotation being as indicated by the arrow.

As best shown in Fig. 2, each tooth is tilted forward in direction of rotation to provide a positive rake angle, ABC, on face 16 of the tooth. Traveling in front of each tooth and preferably formed integral therewith is a triangularly shaped rib 17 which is axially positioned at near end 14 of the teeth on the left-hand roll, which roll turns clockwise. On the right-hand roll, which turns counter-clockwise, ribs 17 are axially positioned on far end of the teeth with respect to near end 15. Rib 17, when extended outwardly to proximity of cutting edge 13, serves two purposes, one being to strengthen the tooth against shock, and the other to provide a means for freeing corn husks that tend to loop around the tooth as it moves forward through the material undergoing reduction. To disentangle the husks from the tooth, face 18 of rib 17 is formed with a negative rake angle as shown in Figs. 2 and 7, this angle being equal to included angle ABD when line B—D is parallel to face 18 of the rib.

To illustrate how rib 17 functions as a guiding means for freeing the husks that become entangled or looped around the moving tooth, reference is made to Figs. 3, 4 and 5 wherein 19 designates a ribbon of husks entangled on tooth 12, the bight 20 of the loop being slidably supported upon inclined face 18 of rib 17, legs 21 and 22 of the ribbon straddling the tooth and trailing therebehind. Under these conditions, the bight is prevented from seating in hollow 23 at base of tooth, as would be the case if rib 17 was eliminated. For this reason, the ribbon of husks will be automatically freed as the tooth moves forward through the material undergoing reduction. The prevailing forces which tend to free bight 20 from the tooth are the backward wiping action of the material through which the bight is plowing, the tensioning of one or both legs 21 and 22 by rubbing friction of the material through which they are drawn as the tooth moves forward, and the centrifugal force which tends to throw or lift the bight radially outward to clear the supporting rib. In other words, the bight is thrown outwardly and simultaneously pushed and pulled towards and over peripheral cutting edge 15 on distal end of the tooth. After reaching the cutting edge as shown in Fig. 6, the bight will be wiped free of the tooth or else it will be severed in two as cutting edge 13 coacts with a stationary cutting element such as shear bar 24 (see Fig. 2 of the drawing).

A modification of my invention is shown in Fig. 7 wherein the roll teeth are mounted on a cylindrical body 25 which has bore 26 that receives the shaft 11, thereby making the toothed element renewable without discarding the shaft. Also, this modification shows negative rake angle ABD on the rib greater than positive rake angle ABC on face of tooth. This angular relation facilitates the freeing of husks from the moving tooth.

With reference to Fig. 1, it will be noted that the roll is made for clockwise rotation, and that ribs 17 are axially located on near end of each tooth, and also, that the teeth are circumferentially spaced so that the helix formed by the peripheral cutting edges is spiraled to the left or in opposite direction to that of roll rotation. With the teeth so arranged, when an ear of corn descends into the reducing zone in parallel relation with the roll, it will be first engaged by rib 17 on one of the leading roll teeth and swung counterclockwise to enter the crushing zone in an endwise or angular direction with respect to the shaft, thereby giving the peripheral cutting edges on the teeth a better opportunity to engage the ear of corn.

With further reference to Fig. 1, if the teeth were spiraled in right hand helical formation, opposite to that shown, then the several ribs would act as a rotating barrier, thereby tending to prevent horizontally disposed ears of corn from engaging the cutting edges. Consequently, it may be stated that when the ribs are positioned on the near side of the teeth, then the teeth should be spiraled in a direction that is opposite hand to the direction of rotation, and vice versa if the ribs are on the far side of the teeth.

It will not be departing from the spirit of my invention if the peripheral cutting edges on the teeth are angled with respect to the axis of rotation.

With further reference to Fig. 2, the rolls 10—10 are journaled in a conventional housing (not shown) having an inlet for material and a bottom discharge opening equipped with a valve mechanism for controlling the rate of efflux of the reduced material. The rolls are made coacting by means of intermeshing gears (not shown), the gears being timed so that the peripheral cutting edges on opposite roll teeth will pass stationary shearing element 24 alternately rather than simultaneously.

In operation, the rolls are buried in the material undergoing reduction, otherwise, the ribs on the teeth would tend to bat the ears of corn upwardly and out of the reducing zone. This also applies to material other than ear corn.

What I claim is:

1. In a toothed rotative element for use in machines that reduce ribbon-like material, a shaft, a plurality of teeth rigidly mounted on the shaft, said teeth extending outwardly and forwardly from the shaft to provide a working face with positive rake angle on each tooth whereby a ribbon of material may loop around a tooth and travel therewith, and means axially positioned at one end and ahead of the tooth face for disentangling the ribbon, said means being a rib having a negative rake angle on forward moving face for guiding bight of the entangled loop outwardly and backwardly over the tooth.

2. The combination as defined in claim 1 wherein the rib-like element is formed integral with the body of the tooth.

3. In a toothed rotative element for use in machines that reduce material, a shaft, a plurality of teeth rigidly mounted on the shaft, said teeth extending outwardly to provide a working face having a positive rake angle relative to direction of movement, and a rib integral with the tooth face having a negative rake angle on face exposed to the material, said rib being axially positioned to strengthen one end of the tooth.

4. In a toothed rotative element for use in machines that reduce material, a shaft, a plurality of teeth rigidly mounted on the shaft, said teeth extending outwardly to provide a working face on each tooth, a cutting edge on distal end of the tooth face, a rib integral with tooth face and extending forwardly to provide a negative rake angle on face exposed to material undergoing reduction, said rib being axially positioned to strengthen the tooth at one end of the cutting edge.

5. In a toothed rotative element for use in machines that reduce ribbon-like material, a shaft, a plurality of teeth rigidly mounted on the shaft, said teeth extending outwardly from shaft to provide a positive rake angle on working face of each tooth whereby a ribbon of material may loop around body of a tooth and travel therewith, a cutting edge on distal end of tooth face, and means axially positioned at one end of tooth face for guiding one leg of the loop outwardly beyond the cutting edge to free entangled ribbon, said disentangling means being a rib integral with tooth face and projecting forwardly therefrom.

6. The combination as cited in claim 5 wherein the negative rake angle on the forward moving face of the rib is relatively large as compared with the positive rake angle on the face of the tooth.

7. In a toothed rotative element for use in a machine that reduces ribbon-like material, a shaft, a plurality of teeth rigidly mounted on the shaft, a distal end cutting edge on each tooth, and a rib axially positioned at one end of the cutting edge for travel ahead of the tooth, the forward face of the rib having a negative rake angle that affords means for guiding ribbon-like material over rib end of the tooth.

8. In a toothed rotative element for use in machines that reduce earcorn or the like, a shaft, a series of spaced teeth mounted on the shaft in spiral formation, said teeth having a positive rake angle, a rib axially positioned for travel ahead of and at nearby end of each tooth face as determined by facing a selected end of the shaft, the forward face of the rib having a negative rake angle relative to direction of movement, and means for minimizing barrier effect of the ribs when adjacent teeth are simultaneously engaging a horizontally disposed ear of corn, said means being the ribbed teeth circumferentially spaced so that two or more teeth form a helix which curves in opposite direction to that of shaft rotation.

9. In a machine for reducing earcorn with husks or the like, in combination, a toothed rotative element including a shaft, teeth rigidly mounted on the shaft and extending outwardly to provide a working face adapted to engage the material, a stationary element positioned to coact with the teeth, a means integral with the face of a tooth and extending forwardly from one end of the face for strengthening the tooth against shock when coacting with the stationary element, and a means likewise formed and positioned for guiding husks over tooth to prevent entanglement thereon, both of said specified means being a rib having an edge with a rake angle that is negative relative to the direction of movement.

References Cited in the file of this patent

UNITED STATES PATENTS

| Number | Name | Date |
|---|---|---|
| Re. 17,120 | Keith | Oct. 30, 1928 |
| 240,034 | McGuire | Apr. 12, 1881 |
| 258,849 | Burdine | May 30, 1882 |
| 992,287 | Stone | May 16, 1911 |
| 1,078,415 | Chalfant | Nov. 11, 1913 |
| 1,116,193 | Wood | Nov. 3, 1914 |
| 2,015,581 | Armour | Sept. 24, 1935 |
| 2,222,073 | Hauge | Nov. 19, 1940 |